(12) United States Patent
Galloway et al.

(10) Patent No.: US 12,212,603 B2
(45) Date of Patent: *Jan. 28, 2025

(54) ADJUSTING BEHAVIOR OF AN ENDPOINT SECURITY AGENT BASED ON NETWORK LOCATION

(71) Applicant: Fortinet, Inc., Sunnyvale, CA (US)

(72) Inventors: Gregory L. Galloway, Suwanee, GA (US); Karl D. Melcher, Canton, GA (US); Michael C. Starr, Reston, VA (US); Scott M. Davis, Wantagh, NY (US)

(73) Assignee: Fortinet, Inc., Sunnyvale, CA (US)

( * ) Notice: Subject to any disclaimer, the term of this patent is extended or adjusted under 35 U.S.C. 154(b) by 345 days.

This patent is subject to a terminal disclaimer.

(21) Appl. No.: 17/033,097

(22) Filed: Sep. 25, 2020

(65) Prior Publication Data

US 2022/0103594 A1    Mar. 31, 2022

(51) Int. Cl.
*H04L 29/00* (2006.01)
*H04L 9/40* (2022.01)

(52) U.S. Cl.
CPC .......... *H04L 63/20* (2013.01); *H04L 63/0272* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 9,251,384 B1 | 2/2016 | Potlapally | |
| 10,348,767 B1* | 7/2019 | Lee | H04L 63/0236 |
| 2010/0199332 A1* | 8/2010 | Bachmann | H04L 63/164 |
| | | | 370/252 |
| 2013/0254831 A1 | 9/2013 | Roach | |
| 2017/0237860 A1* | 8/2017 | Mumick | H04M 3/42195 |
| | | | 455/417 |
| 2021/0234860 A1* | 7/2021 | Bansal | H04W 12/37 |
| 2022/0078209 A1 | 3/2022 | V | |

* cited by examiner

Primary Examiner — Jeffrey C Pwu
Assistant Examiner — Helai Salehi
(74) Attorney, Agent, or Firm — Jaffery Watson Hamilton & DeSanctis LLP

(57) ABSTRACT

Systems and methods for adjusting the behavior of an endpoint security agent based on a network location are provided. According to an embodiment, an agent of an endpoint device detects whether the endpoint has moved to a new network by monitoring for changes to an IP address associated with the endpoint. When the detecting is affirmative, the agent further determines whether a trusted network determination service associated with a cloud-based security service is reachable. When the determining is affirmative, the agent further identifies whether the new network is among a set of trusted networks that have been previously registered with the cloud-based security service by querying the trusted network determination service. When the identifying is affirmative, a particular security feature on the endpoint is configured for operation within a trusted network and when the identifying is negative, the particular security feature is configured for operation outside of a trusted networks.

28 Claims, 10 Drawing Sheets

ADJUSTING BEHAVIOR OF AN ENDPOINT SECURITY AGENT BASED ON NETWORK LOCATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network security. In particular, embodiments of the present invention relate to adjusting the security behavior of an endpoint security agent running on a client device based on a determination of whether the client device is within a trusted network or outside of the trusted network.

Description of the Related Art

Enterprises want to protect their devices, irrespective of where the devices are located within trusted domains or outside the trusted domain. An endpoint security agent may be placed on a protected device to keep the device safe even outside the trusted domain. For example, an always-on Secure Sockets Layer (SSL) Virtual Private Network (VPN) tunnel may be used to route end-user traffic up to a cloud-based security platform (e.g., a Secure Access Service Edge (SASE) cloud) through a cloud-hosted Firewall (FW). As the always-on SSL VPN tunnel routes all the traffic to the cloud-hosted FW, the protected device, when located inside a trusted domain (e.g., a remote office), won't be able to access enterprise resources. In order to access the enterprise resources, the user may be required to manually pause the always-on SSL VPN tunnel when they are in a trusted domain and/or add a local firewall rule to block the service.

SUMMARY

Systems and methods are described for adjusting the behavior of an endpoint security agent based on a network location. According to an embodiment, an agent (e.g., an endpoint protection agent) running on an endpoint device detects whether the endpoint device has been moved to a new network, determines whether a trusted network determination service associated with the cloud-based security service is reachable via the new network, and identifies whether the new network is among trusted networks that have been previously registered with the cloud-based security service by querying the trusted network determination service. The agent configures a particular security feature to be implemented by the agent for operation inside one of the trusted networks if the new network is among the trusted networks, and configures the particular security feature for operation outside of the plurality of trusted networks if the new network is not among the trusted networks. In an embodiment, the agent configures the particular security feature for operation outside of the plurality of trusted networks, if the trusted network determination service associated with the cloud-based security service is not reachable via the new network.

In an embodiment, the agent determines a change of network by monitoring for changes to an Internet Protocol (IP) address associated with the endpoint device. The IP address associated with the endpoint device may be an IP address associated with a primary ethernet adapter of the endpoint device. In an embodiment, the particular security feature comprises a secure Internet tunnel between the endpoint device and cloud-based security service. The configuration of the secure Internet tunnel for operation inside one of the trusted networks includes deactivating the secure Internet tunnel, and configuration of the secure Internet tunnel for operation outside of the trusted networks comprises activating the secure Internet tunnel. The secure Internet tunnel comprises a secure Transport Layer Security (TLS) connection between the agent and cloud-based security infrastructure (e.g., firewall) associated with the SASE platform. The endpoint device gets access to local resources within the new network once the secure Internet tunnel is deactivated. When activated, the secure Internet tunnel protects communication to, from, and through the endpoint device by routing the communication via the cloud-based security service. In an embodiment, the cloud-based security service may have multiple instances of trusted network determination services running in multiple regions throughout the world, and the endpoint device connects the trusted network determination service that is nearest to the endpoint device.

In an embodiment, the agent on determining that the endpoint device has moved to a new network may deactivate the secure Internet tunnel (e.g., TLS connection) between the endpoint and cloud-based security infrastructure (e.g., FWaaS). The agent may activate the secure Internet tunnel between the endpoint and the cloud-based security infrastructure that protects communications via the new network to the cloud-based security infrastructure.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1:
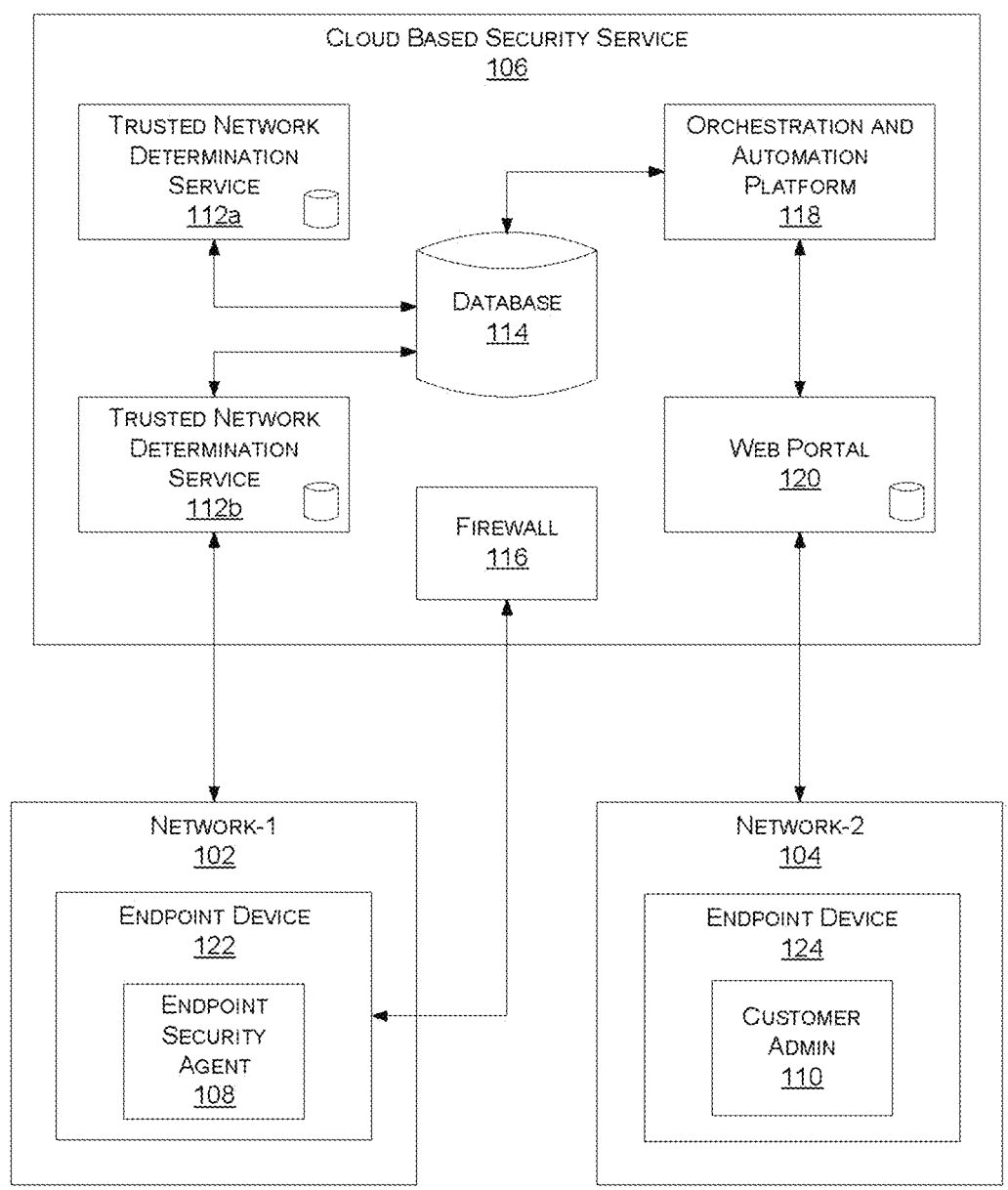
FIG. 1 illustrates a cloud-based security arrangement and an example use case for facilitating the dynamically adaptive behavior of an endpoint security agent in accordance with an embodiment of the present disclosure.

Systems and methods are described for adjusting the behavior of an endpoint security agent based on a network location. In accordance with various embodiments described herein, an endpoint agent automatically adapts to the environment of the endpoint. For example, the agent may enable/disable or reconfigure one or more security functions based on the location of the endpoint (e.g., inside/outside of a trusted network) by, for example, querying a cloud-based network determination service responsive to detecting a change in location. According to one embodiment, the agent automatically disables the use of a secure Internet tunnel when the endpoint is located in a trusted network that is already behind a local firewall or a SASE Firewall as a Service (FWaaS) offering.

In another embodiment, the agent can enable/disable or reconfigure one or more security functions that communicate with cloud-based security-function-specific services, when the corresponding service becomes unavailable, unreachable or unresponsive, and the decision to enable/disable/reconfigure or how to reconfigure may be based on the agent's network location as determined by querying the cloud-based network determination service. For example, the endpoint agent may include a software-defined micro-segmentation security feature, which provides visibility and control of East-West traffic (e.g., network traffic within the protected network behind the SASE FWaaS), and may reconfigure operation of the micro-segmentation security feature when a corresponding cloud-based security service (e.g., provided by a segmentation controller) is unavailable, unreachable or unresponsive based on the location of the endpoint device on which the agent is running.

Embodiments of the present invention include various steps, which will be described below. The steps may be performed by hardware components or may be embodied in machine-executable instructions, which may be used to cause a processing resource (e.g., a general-purpose or special-purpose processor) programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

The phrase "endpoint protection platform" generally refers to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the FORTIEDR Software as a Service (SaaS) platform and the FORTICLIENT integrated endpoint protection platform available from Fortinet, Inc. of Sunnyvale, CA.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides the one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances).

FIG. 1 illustrates a cloud-based security arrangement 100 and an example use case for facilitating the dynamically adjusting behavior of an endpoint security agent in accordance with an embodiment of the present disclosure. Protected endpoint devices (e.g., portable user devices) may have security features that protect the endpoint devices as they move across multiple trusted networks and public networks. Enterprises may install an endpoint security agent (e.g., endpoint security agent 108) on endpoint devices (e.g., endpoint device 122) to route network traffic in a secure manner, for example, between the endpoint device and a cloud-based security service (e.g., cloud-based security service 106, a non-limiting example of which is a SASE platform). The endpoint security agent may be configured to change its behavior, for example, the way it processes network traffic, applies security policies, uses a secure Internet tunnel, uses cloud services, accesses protected resources, etc., depending on whether the endpoint device on which it is running is within a trusted network of a list of a trusted networks of a subscribing enterprise, or is outside of the list of trusted networks. Depending upon the particular implementation, the list of trusted networks may be registered with the cloud-based security service during a new subscriber registration process or a subscription process specific to a particular security service, for example.

In an embodiment, an endpoint security agent installed on an endpoint device may implement one or more security features. A non-limiting example of a security feature is a secure Internet connection (e.g., a Secure Sockets Layer Virtual Private Network tunnel or a TLS connection) between the endpoint device and a component (e.g., a cloud-based firewall 116) of the cloud-based security service to protect communications between the endpoint device and the cloud-based security service when the endpoint device is outside of the trusted networks. The secure Internet connection, for example, an SSL VPN tunnel, may route all network traffic originating from, destined to, or passing through the endpoint device 108 to the firewall 116 to provide better visibility and security for all Internet-based traffic. In contrast to other agents that require users to pause or halt a particular security feature (e.g., a secure Internet connection), the agent 108 may automatically deactivate, pause, or disable the particular security feature when the endpoint device 122 is within a network that is part of a list of trusted networks. In one embodiment, the agent 108 is configured to automatically disable one or more security features (e.g., a secure Internet connection) when the endpoint device 122 is located in a network 1 102 that is known to be securely connected to the firewall 116 (e.g., a SASE cloud-based firewall offering). While in various examples described herein, the agent 108 is described as enabling or disabling a secure Internet connection between the agent 108 and the cloud-based security service 106, those skilled in the art will appreciate the location detection approaches described herein are generally applicable to scenarios in which it is desirable to change the behavior of an endpoint agent based on whether an endpoint device on which the agent is running is present within a trusted network or is connected instead to an untrusted network (e.g., is outside a list of trusted networks).

In an embodiment, the cloud-based security service may have multiple instances of a trusted network determination service (e.g., trusted network determination service 112a, trusted network determination service 112b, etc.) that can confirm on behalf of an endpoint security agent whether a particular network to which its endpoint device is connected is part of a list of trusted networks. In order to reduce latency and/or network congestion, for example, experienced by subscribers of the cloud-based security service 106, instances of the trusted network determination service 112*a-b* may distributed across multiple regions throughout the world. The number and distribution of the instances may depend upon various factors, for example, the geographic coverage of the cloud-based security service 106 and/or the number of subscribers within various geographical regions.

In the context of the present example, the services 112*a-b* make use of respective, local databases, which may be periodically synchronized with a centralized database (e.g., database 114), which maintains an up-to-date list of trusted networks on behalf of a subscriber of the cloud-based security service 106. While for sake of simplicity, various examples and scenarios herein may be described with reference to a single subscriber, those skilled in the art will appreciate the cloud-based security service 106 may support tens, hundreds or thousands of subscribers and separate lists of trusted networks may be maintained for each subscriber within the same database (e.g., a shared database with a shared schema and logically and physically isolated data storage on a per subscriber (tenant) basis) or by using different databases.

In one embodiment, the cloud-based security service 106 allows an administrator of a subscribing entity (e.g., customer admin 110 using endpoint device 124) to subscribe to various services via endpoint device 124, which may be within the same network or a different network (e.g., network-2 104) as endpoint device 122. In connection with a registration process associated with a subscription, for example, the cloud-based security service 106 may allow customer admin 110 to submit a list of trusted networks (e.g., main office and/or branch office networks) including their respective public IP addresses through a web portal 120. The web portal 120 may, among other things, allow users (e.g., customer admin 110) to update the list of trusted networks and configure other network and network security services. Responsive to receipt of the list of trusted networks, the web portal 120 may incorporate the list within a change request and place the change request on a remote work queue (not shown) accessible by an orchestration and automation (O&A) platform (e.g., O&A platform 118). In this manner, the customer admin 110 may add one or more new trusted networks (e.g., a network associated with a new branch office location) that are to be associated with the subscribing organization at issue, delete one or more existing trusted networks, and/or change the public IP addresses associated with one or more existing trusted networks through the web portal 120.

In an embodiment, the O&A platform 118, which may be part of the cloud-based security service 106 or which may represent a platform external to the cloud-based security service 106, retrieves from a remote work queue (potentially of multiple remote work queues the O&A platform 118 is configured to poll), a change request queued by the web portal 120. The change request may contain, among other things, configuration information including public IP addresses of one or more trusted networks. Responsive to receipt of the configuration information, the O&A platform 118 may update the database 114 to include the trusted network or update the list of trusted networks based on the updated information. Depending upon the particular implementation, the O&A platform 118 may also react to other types of changes to SASE configuration and/or policy and propagate them and/or apply them to the appropriate system components or services, such as trusted network determination services 112*a-b*, firewall 116, and the database 114. Changes to the centralized database 114 may be pulled by or pushed to the trusted network determination services 112*a-b* on a periodic basis. For example, the trusted network determination services 112*a-b* may poll the database 114 periodically for changes. In alternative embodiments, the trusted network determination services 112*a-b* may directly refer to the database 114 and may not maintain a local database.

In an embodiment, the trusted network determination services 112*a-b* may retrieve an updated list of trusted networks for one or more subscribing organizations from the database 114. The trusted networks for a particular subscribing organization may include networks of the organization that are securely connected to the cloud-based security service 106 via an edge device (not shown). In one embodiment, endpoint security agent 108 may request a determination regarding whether the network-1 102 to which the endpoint device 122 on which the endpoint security agent 108 is running is a trusted network by invoking an application programming interface (API) (e.g., a public Representational State Transfer (REST) API) associated with the trusted network determination services 112*a-b*. Responsive to receipt of the request, a particular regional trusted network determination service (e.g., trusted network determination service 112*b*) may determine (e.g., based on the source IP address of the request) whether a network from which an endpoint device is sending the request is part of the list of trusted networks for the subscriber at issue. The trusted network determination service 112*b* may respond in the affirmative (e.g., with a Hypertext Transfer Protocol (HTTP) status code 503) when the network 102 is on the list of trusted networks, or respond in the negative (e.g., with an HTTP status code of 200) the network 102 is not on the list of trusted networks.

In an embodiment, the endpoint security agent 108, upon determining the endpoint 122 has moved to a new network (e.g., network-2 104), may issue a request to the trusted network determination service 112*a-b* (which may be directed to the nearest instance of trusted network determination service 112*a-b*) for a determination regarding whether the new network is a trusted network. The agent 108 may implement one or more security features, some of which may operate differently (e.g., enabled/disabled or reconfigured) depending upon whether the agent 108 is inside one of the trusted networks. As such, in the context of the present example, when the response from the trusted network determination service 112*a-b* indicates the new network is among the trusted networks on the list of trusted networks, the endpoint security agent 108 may configure the particular security feature for a mode of operation consistent with being inside a trusted network. And, when the response from the trusted network determination service 112*a-b* indicates the new network is not among the trusted networks on the list of trusted networks, the endpoint security agent 108 may configure the particular security feature for another mode of operation consistent with being outside a trusted network. In an embodiment, the endpoint security agent 108 automatically establishes a secure Internet connection to firewall 116, which provides privacy and security when the endpoint device 122 is in an untrusted network. Additionally, the endpoint security agent 108 may automatically disconnect the secure Internet connection when the endpoint device 122 is in a trusted network.

In an embodiment, a customer admin 110 may configure a new remote office to be part of the trusted networks by adding the public IP address of the remote office to the list of trusted networks via web portal 120. The portal 120 may allow a customer or partner to enter a list of restricted networks and trusted networks as IP addresses or Classless inter-domain routing (CIDRs). Classless inter-domain routing (CIDR) is a set of Internet protocol (IP) standards that are used to create unique identifiers for networks and individual devices. The O&A platform 118 may detect the change, pull the list of trusted networks from the web portal 120 and push the list of trusted networks to the database 114. Trusted network determination services 112a-b potentially distributed across multiple regions throughout the world may synchronize their respective local databases with the database 114 by pulling the list of trusted networks and stores in a local database.

In various examples described herein, the endpoint security agent 108 detects the endpoint device 122 has moved to a new network by monitoring for changes to an IP address assigned to the endpoint device 112 (e.g., the IP address of a primary ethernet adapter of the endpoint device 122). In accordance with one particular use case in which the security feature whose behavior is to be modified based on whether the endpoint device 122 is inside or outside of a trusted network is a secure Internet connection between the endpoint security agent 108 and the firewall 116, the endpoint security agent 108 may disable or pause the secure Internet connection if the secure Internet connection is currently enabled to permit reevaluation regarding whether to enable the secure Internet connection or leave it in the disabled state. In the context of this particular use case, the endpoint security agent 108 queries the trusted network determination service to determine whether the endpoint device 122 s in a trusted network. If the trusted network determination service 112b returns a response indicating the endpoint device 122 is in a trusted network, the endpoint security agent 108 may pause or disable the secure Internet connection until another network change is detected. Otherwise, when the trusted network determination service 112b response indicates that the endpoint device 122 is in an untrusted network, or the trusted network determination service was unreachable or unresponsive, the endpoint security agent 108 may enable the secure Internet connection. Those skilled in the art will appreciate this particular usage scenario may be generalized to include the endpoint security agent 108 changing its behavior or security implementations dynamically based on the determination regarding whether the endpoint device 122 is within one of the trusted networks or outside the trusted networks.

Figure 2:
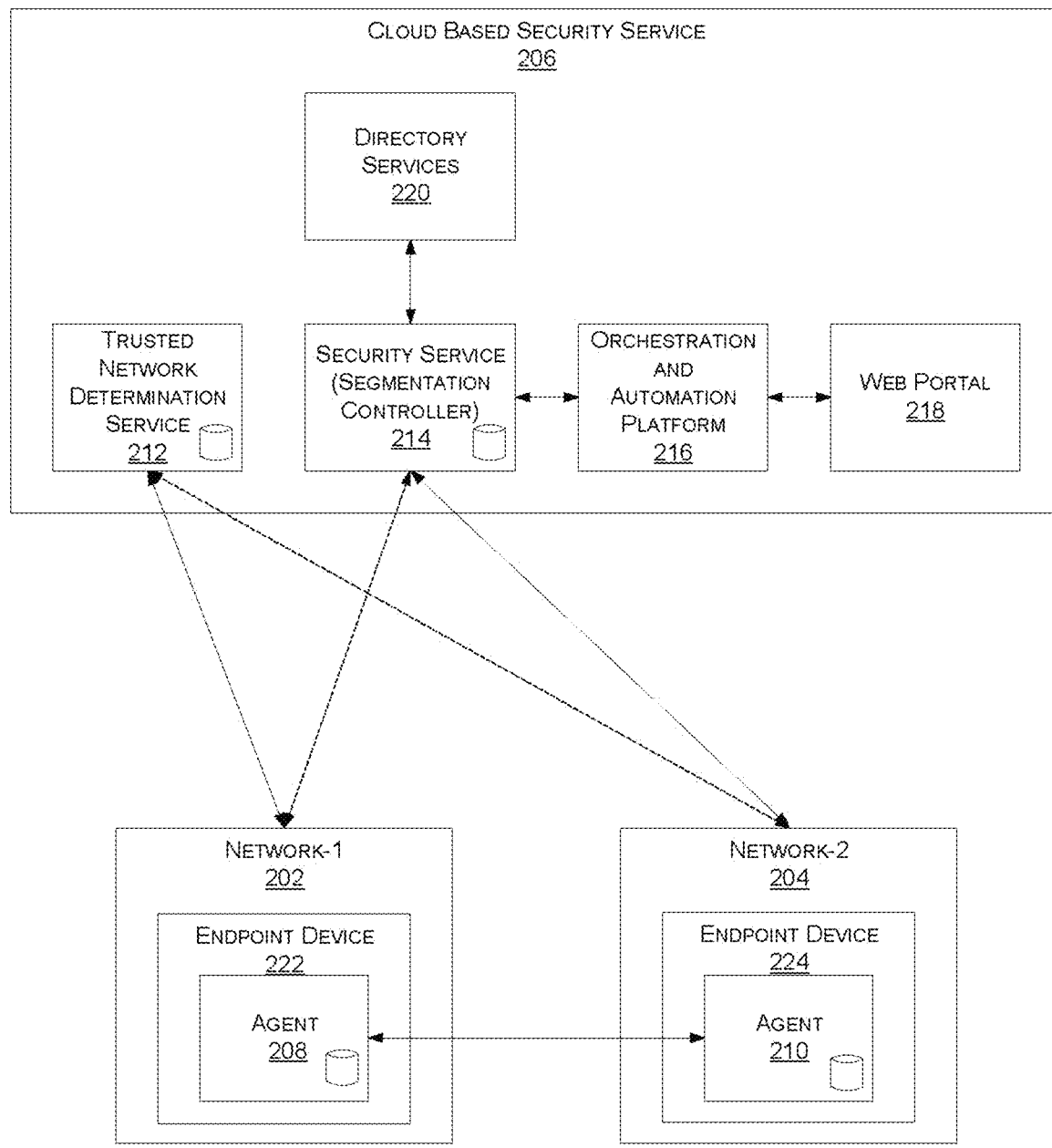
FIG. 2 illustrates a cloud-based security arrangement and an example use case for facilitating the dynamically adaptive behavior of an endpoint security agent in accordance with an embodiment of the present disclosure.

FIG. 2 illustrates a cloud-based security arrangement and an example use case for facilitating the dynamically adaptive behavior of an endpoint security agent in accordance with an embodiment of the present disclosure. To provide visibility and control of East-West traffic within a network, a security service 214 (for example, provided by a segmentation controller), associated with cloud-based security service 206 may be used. In the context of the present example, the security service 214 controls East-West traffic originating from and targeted to a network resource (e.g., second endpoint device 224, which may be a server) present in a secure network of an organization. Each endpoint associated with an organization may have an agent 208 or 210 (e.g., an endpoint security agent 108 including micro-segmentation functionality) to control traffic. As shown in FIG. 2, agent 208 may be installed on an endpoint device 224, and an agent 210 may be installed on an endpoint device 224 (server 224), which generally rely on guidance from the segmentation controller 214 based on security rules (e.g., potentially dynamically changing user-based security rules and IP-based security rules) maintained by segmentation controller 214 when they are within a secure network (also referred herein as a trusted network). However, in some embodiments, the agents 208 and 210 may be operable to reconfigure operation of their respective local segmentation functionality when the security service 214 is not reachable or is unresponsive based on the location of the endpoint device 222 or 224, respectively, as determined with reference to the trusted network determination service 212.

In an embodiment, an agent (e.g., agent 208 or 210) intercepts a connection attempt between the endpoint device 222 and the endpoint device 224 and consults segmentation controller 214 for permission before allowing the connection to proceed. The connection attempt may represent (i) an outbound connection attempt from a client to a server intercepted by an agent running on the client, (ii) an inbound connection attempt from a client to a server intercepted by an agent running on the server, (iii) an outbound connection attempt from a server to a client intercepted by an agent running on the server, or (iv) an inbound connection attempt from a server to a client intercepted by an agent running on the client. When segmentation controller 214 is not reachable or is otherwise unresponsive, the agent consults the trusted network determination service 212 to determine whether the endpoint device is inside a trusted network. When the endpoint device is confirmed to be in a trusted network, but not able to reach the segmentation controller 214, the agent may enforce security rules using a local cache of IP-based rules. In an embodiment, when the endpoint device 222 is confirmed to be outside of a trusted network, the agent may allow the connection. The dynamic adaptation of security rules based on location (within a trusted network or outside the trusted network) by endpoint devices allows endpoint devices to work normally when a user leaves the secure network (e.g., of a main office or branch office) and goes home and is not on the corporate VPN, for example.

In an embodiment, an agent 210 associated with the endpoint device 224 (also referred to as server 224) intercepts connection requests and consults the segmentation controller 214 to check if the agent 224 should allow the inbound connection. The endpoint device 224 may be another workstation that hosts a service (e.g., file sharing), so it doesn't assume that it is always in a trusted network. When the segmentation controller 214 is not reachable or unresponsive, the agent 210 consults the trusted network determination service 212 to determine if the endpoint device 224 is inside a trusted network. As with the agent 208, the agent 210 consults the trusted network determination service 212. When the segmentation controller 214 is not reachable or is unresponsive, the endpoint device 224 may enforce security policy using its local cache of IP-based rules until the endpoint device 224 is in the secure network. When the endpoint device 224 is outside of a trusted network, the agent will allow the connection.

In an embodiment, the segmentation controller 214 may query the corporate directory services 220 to enforce user-based policies, which may dynamically track the IP addresses of users as they change. For example, agents (e.g., agent 208 and agent 210) may be configured to report user information with each connection attempt in order to process the connection request.

In an embodiment, the agent 208 running on an endpoint device 222 connects to a security service 214 of a cloud-based security service 206 and determines whether service is reachable or is unresponsive. When the security service, for example, segmentation controller 214, is not reachable or is unresponsive, the agent 208 determines whether the endpoint device 222 is within a trusted network of a plurality of trusted networks that have been previously registered with the cloud-based security service 206.

Agent 208 determines whether the endpoint device is within a trusted network of trusted networks by querying a trusted network determination service 212 associated with the cloud-based security service 206. The agent configures the particular security feature (e.g., applying locally cached security rules) for operating inside one of the plurality of trusted networks if the endpoint is within the trusted network, and configures the particular security feature for operation outside of the plurality of trusted networks if the endpoint is not within the trusted network.

In another example embodiment, an agent 208 running on an endpoint device 222 may be subject to security rules related to access of network resources on different segments of the network-1 202. To secure network resources located across different networks and segments of the networks, the agent 208, when present inside the network that is part of the trusted networks, generally refers to segmentation controller 214 to process network traffic by security rules available at the segmentation controller 214. In an embodiment, when the endpoint device 222 tries to connect to a server 224, the agent 208 may intercept the connection request, determine if the segmentation controller 214 is reachable or unresponsive, and determine if the endpoint device 222 is within a trusted network of a list of trusted networks. In response to the determination that the segmentation controller 214 is not reachable or is unresponsive, agent 208 may further determine if the endpoint device 222 present within the trusted network. In an embodiment, if the agent 208 is not reachable or is unresponsive, and the endpoint device 22 is within the trusted network, the agent 208 may use locally cashed security rules. The endpoint device 222 maintains a local copy of the security rule retrieved from the segmentation controller 214. The particular security feature includes micro-segmentation that controls access to resources present in a different segment of a protected segment. In an embodiment, the agent maintains a local cache of security rules received from the security service (e.g., segmentation controller 214), intercepts a communication attempt at the endpoint device 222, and determines whether the communication attempt is authorized by the security service (e.g., segmentation controller 214). When the security service (e.g., the segmentation controller 214) is not reachable, the agent 208 is configured to process network traffic based on the security rules in the local cache. The agent 208 may allow or disallow the communication attempt based on the security rules in the local cache. In an embodiment, the agent 208 intercepts the communication attempt between endpoint device 222 and a second endpoint device 224, access to which is controlled using Internet Protocol (IP)-based security rules. The agent 208 uses the security rules stored in the local cache if the agent is not able to reach the security service. As described above, the agent 208 uses the security rules of the security service (e.g., the segmentation controller 214) when the security service is reachable, and the endpoint device is present within any of the trusted network.

In an embodiment, an agent 208 may be installed on endpoint device 222, and an agent 210 may be installed on the second endpoint device 224 (e.g., server) that enforce a security policy on all East-West traffic that doesn't go through a traditional firewall, when the user is in a trusted network. Agents consult a Segmentation Controller, which resides in the SASE cloud, and enforces user and IP-based policy. While some existing segmentation solutions centrally manage policy, they perform policy enforcement locally at each endpoint based on policies pushed from the centrally managed source to the endpoints. Notably, this limits the policy to IP-based rules and does not support Dynamic Host Configuration Protocol (DHCP)-assigned IP addresses. The approach described herein allows the controller to track users and DHCP-assigned addresses dynamically and facilitates enforcement of both user and IP-based policies.

In one embodiment, agents maintain local policies in a cache containing only IP-based rules. When the endpoint device is in a trusted network, but the segmentation controller is unreachable or unresponsive, the agent may allow or block connection attempts based on the locally cached IP-based rules.

In an embodiment, an orchestration and automation (O&A) platform 216 is configured to collect user-based security rules or IP-based security rules from remote work queues. A network administrator may submit the security rules through web portal 218 from which the O&A platform 216 may collect the security rules and update the directory services 220. The O&A platform 216 may collect configuration information related to the trusted networks and help the trusted network determination service 212 to keep an updated list of trusted networks associated with the organization.

Figure 3:
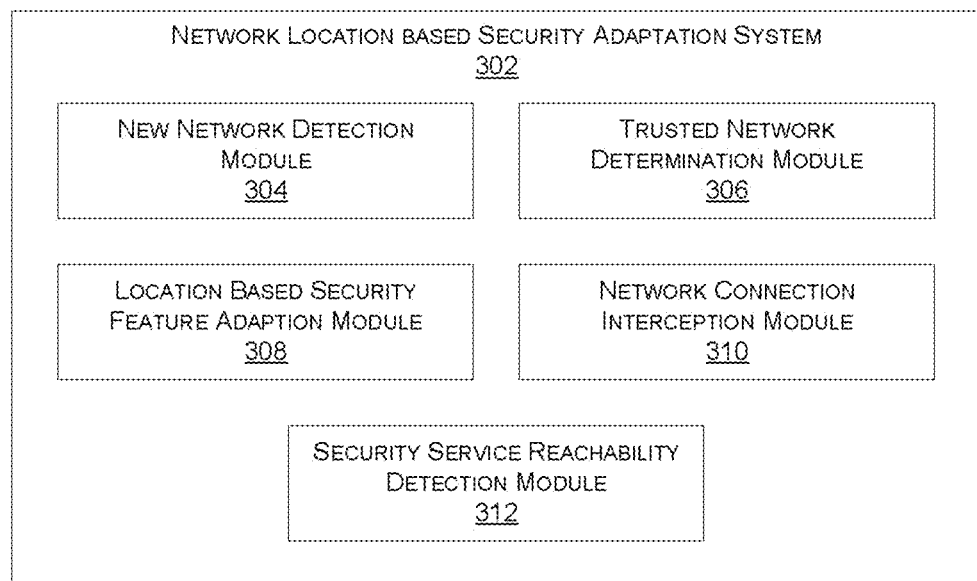
FIG. 3 illustrates functional modules of a network location-based security adaption system in accordance with an embodiment of the present disclosure.

FIG. 3 illustrates the functional module of a network location-based security adaption system 302 in accordance with an embodiment of the present disclosure. The network location-based security adaption system 302 includes a new network detection module 304 configured as an agent (e.g., an endpoint protection agent) running on an endpoint device to detect whether the endpoint device has been moved to a new network, and a trusted network determination module 306 configured to determine whether a trusted network determination service associated with cloud-based security service is reachable via the new network, and identify whether the new network is among a plurality of trusted networks that have been previously registered with the cloud-based security service by querying the trusted network determination service.

The system 302 further includes a location-based security feature adaption module 308 configured at the agent to adapt a particular security feature implemented by the agent for operation inside one of the plurality of trusted networks if the new network is among the plurality of trusted networks, and adapt the particular security feature for operation outside of the plurality of trusted networks if the new network is not among the plurality of trusted networks. In an embodiment, the module 302 causes the agent to adapt the particular security feature for operation outside of the plurality of trusted networks, if the trusted network determination service associated with the cloud-based security service is not reachable via the new network.

The new network detection module 304 determines the change of network by monitoring for changes to an Internet Protocol (IP) address associated with the endpoint device. The IP address associated with the endpoint device may be an IP address associated with a primary ethernet adapter of the endpoint device. In an embodiment, the particular security feature comprises a secure Internet tunnel between the endpoint device and cloud-based security service. The configuration of the secure Internet tunnel for operation inside one of the trusted networks includes deactivating the secure Internet tunnel, and configuration of the secure Internet tunnel for operation outside of the trusted networks comprises activating the secure Internet tunnel. Depending on the particular implementation, the secure Internet tunnel may comprise a secure Transport Layer Security (TLS) connection between the agent and cloud-based security infrastructure (e.g., a firewall) associated with a SASE platform.

The location-based security feature adaption module 308 allows access to local resources within the new network by the endpoint device once the secure Internet tunnel is deactivated. When the secure tunnel is activated, the location-based security feature adaption module 308 routes communications to, from, and through the endpoint device via the cloud-based security service. In an embodiment, the cloud-based security service may have multiple instances of trusted network determination services running in multiple regions throughout the world, and the endpoint device connects to the trusted network determination service that is nearest to the endpoint device. In an embodiment, the location-based security feature adaption module 308, running as an agent of the endpoint device, may deactivate the secure Internet tunnel (e.g., a TLS connection or tunnel) between the endpoint and cloud-based security infrastructure (e.g., FWaaS) when the endpoint device has moved to a new network that is part of a list of trusted networks. The location-based security feature adaption module 308 may activate the secure Internet tunnel between the endpoint and the cloud-based security infrastructure that protects communications via the new network to the cloud-based security infrastructure when the trusted network determination service is not reachable or when the endpoint device has moved to a new network that is not one of the trusted networks on a list of trusted networks.

According to an embodiment, the system 302 may further include a network connection interception module 310 configured as an agent at the endpoint device to intercept connection attempt, and a security service reachability detection module 312 configured to determine whether a security service of a cloud-based security service is reachable. The security service may be related to a particular security function implemented by the agent. When the security service is not reachable or is unresponsive, the trusted network determination module 306 determines whether the endpoint device is within a trusted network of a plurality of trusted networks that have been previously registered with the cloud-based security service. The module 306 determines whether the endpoint device is within a trusted network of a plurality of trusted networks by querying a trusted network determination service associated with the cloud-based security service. The location-based security feature adaption module 308 applies the particular security feature for operating inside one of the plurality of trusted networks if the endpoint is within the trusted network, and configures the particular security feature for operation outside of the plurality of trusted networks if the endpoint is not within the trusted network. The particular security feature may include micro-segmentation that controls access to resources present in different segments of a protected segment.

In an embodiment, when the security service (e.g., the segmentation controller) is not reachable, the location-based security feature adaption module 308 processes network traffic based on the security rules in the local cache. The location-based security feature adaption module 308 may allow or disallow the communication attempt based on the security rules in the local cache.

The location-based security feature adaption module 308 causes the agent on the endpoint device to use locally cashed IP-based rules if the endpoint device is within the trusted network, but the segmentation controller is not reachable or is not responsive. The location-based security feature adaption module 308 causes the agent to use any or of a combination of user-based security rules and IP-based security rules available at the segmentation controller if the endpoint device is located within the trusted network and the segmentation controller is reachable. In an embodiment, the location-based security feature adaption module 308 may allow connection requests to and from the endpoint device if the endpoint device is not within any of the trusted networks.

Figure 4A:
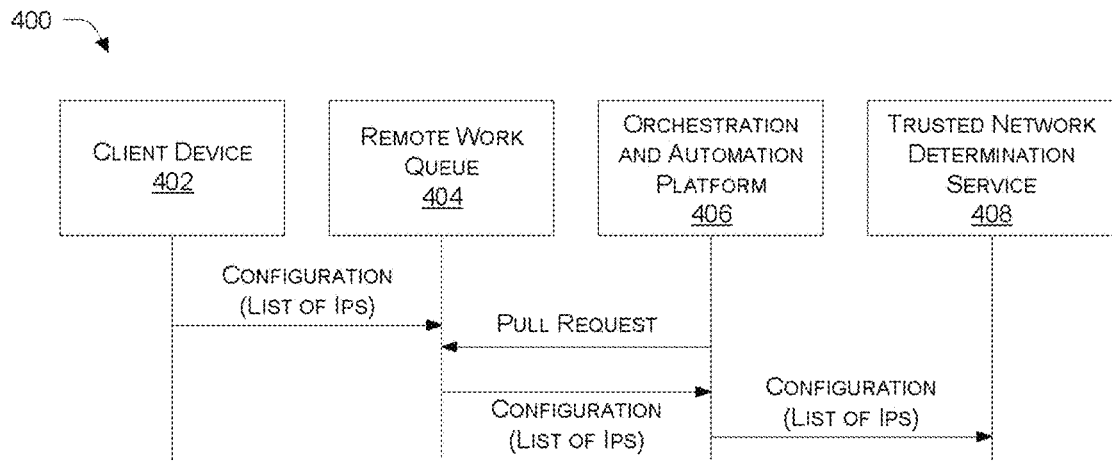
FIG. 4A is a sequence diagram illustrating maintenance of an updated list of secure networks by a cloud-based global public service library in accordance with an embodiment of the present disclosure.

FIG. 4A is a sequence diagram 400 illustrating maintenance of an updated list of secure networks by a cloud-based global public service in accordance with an embodiment of the present disclosure. A trusted network determination service 408 maintains a list of trusted networks with the help of orchestration and automation platform 406. As shown in FIG. 4A, a client device 402 may submit configuration information, for example, including a list of global IP addresses of protected networks of an organization to a remote work queue 404. The orchestration and automation platform 406 may send a pull request to the remote work queue 404 and receive the list of global IP addresses of the trusted networks. In an embodiment, the orchestration and automation platform 406 may push the list of global IP addresses of the trusted networks to the trusted network determination service 408. In an embodiment, the trusted network determination service 408 may pull the list of trusted networks (list of global IP addresses of trusted networks) from a central database to which the O&A platform 406 may push the update. In this manner, the client device 402 may submit an update with respect to removal, addition or modification of a trusted and the trusted network determination service 408 is updated appropriately.

Figure 4B:
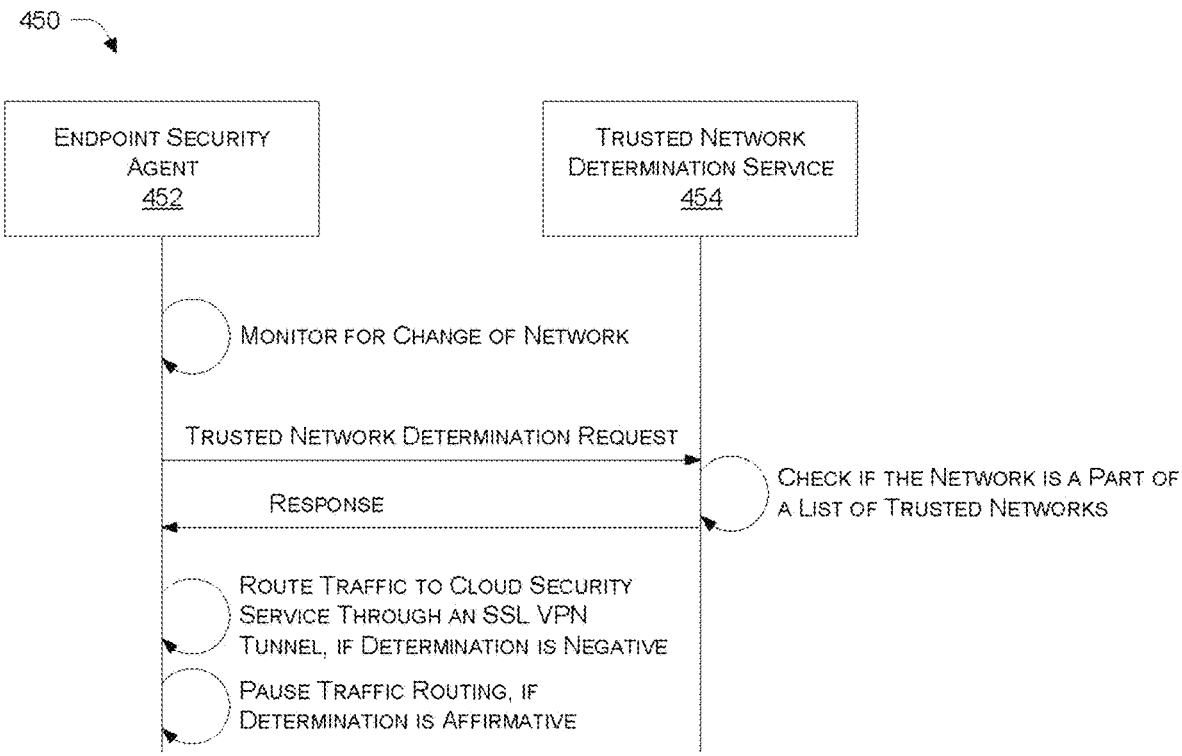
FIG. 4B is a sequence diagram illustrating determination of whether a computing device is within a secure network and a determination dependent actions in accordance with an embodiment of the present disclosure.

FIG. 4B is a sequence diagram 450 illustrating determination of whether a computing device is within a secure network and a determination dependent actions in accordance with an embodiment of the present disclosure. As shown in FIG. 4B, an endpoint security agent 452 may determine a change of a network, and on detection of a new network, send a trusted network determination request to a trusted network determination service 454 (which may be the same as trusted network determination service 408) to determine whether the new network is part of the list of trusted networks. The trusted network determination service 454 checks if the network is part of a list of trusted networks, sends an affirmative response if the network is part of the list of trusted networks, and send a non-affirmative (negative) response if the network is not part of the list of trusted networks. In an embodiment, the endpoint security agent 452 may route traffic to a cloud-based security service (e.g., cloud-based security service 106 or 206) through a secure Internet connection (e.g., an SSL VPN tunnel), when the endpoint on which it is running is not connected to a trusted network. The endpoint security agent 452 may pause the secure Internet connection when the determination is affirmative (when the endpoint is connected to a trusted network). In this manner, the endpoint security agent 452 may automatically initiate traffic routing through the secure Internet tunnel as soon as the endpoint device is detected to be out of the trusted network.

Figure 5:
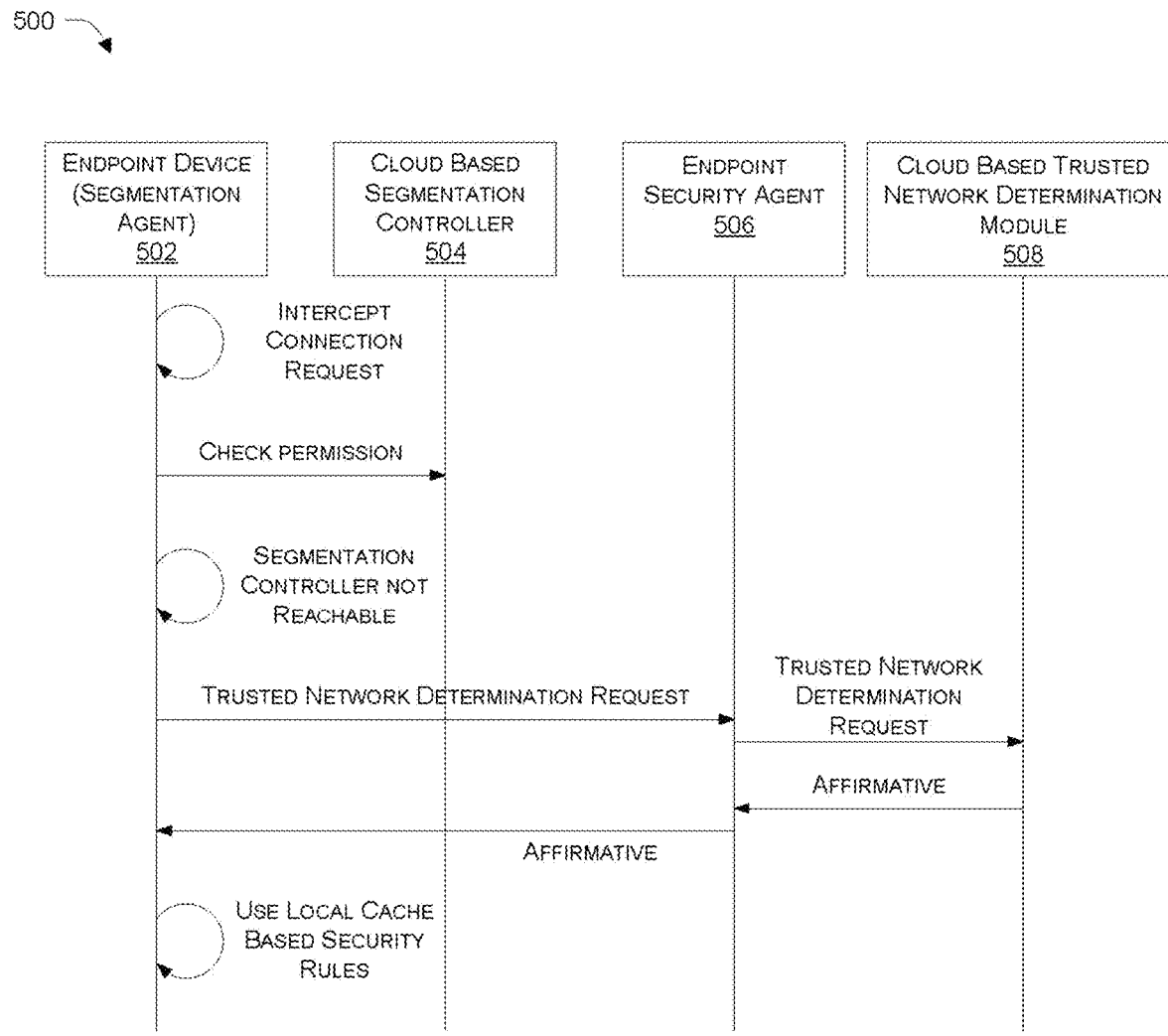
FIG. 5 is a sequence diagram illustrating an example network location-based policy usage in accordance with an embodiment of the present disclosure.

FIG. 5 is a sequence diagram 500 illustrating an example network location-based policy usage in accordance with an embodiment of the present disclosure. In an embodiment, an endpoint device 502 may have a segmentation agent 502 configured to consult a cloud-based segmentation controller 504 to apply security rules on network traffic originating from the endpoint device 502 or passing through the endpoint agent 504 or destined to endpoint device 502. The segmentation agent of endpoint device 502 may intercept connection requests and check for permission from the cloud-based segmentation controller 504 to refer to security rules based on which the connection request can be processed. When the segmentation controller 504 is unreachable or otherwise unresponsive, the endpoint device 502 proceeds to determine whether it is within a trusted network by sending a trusted network determination request through an endpoint security agent 506 to a cloud-based trusted network determination server. In response to an affirmative determination that the endpoint device 502 is within the trusted network, the endpoint security agent 506 may reconfigure the segmentation agent at the endpoint device 502 for operation within the trusted network, for example, by causing the segmentation agent to use locally cached security rules.

The cloud-based security service (e.g., cloud-based security service 106 and 206), the various systems and services associated with the cloud-based security service described herein, and the processing described below with reference to the flow diagrams of FIGS. 6-8B may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 9 below.

Figure 6:
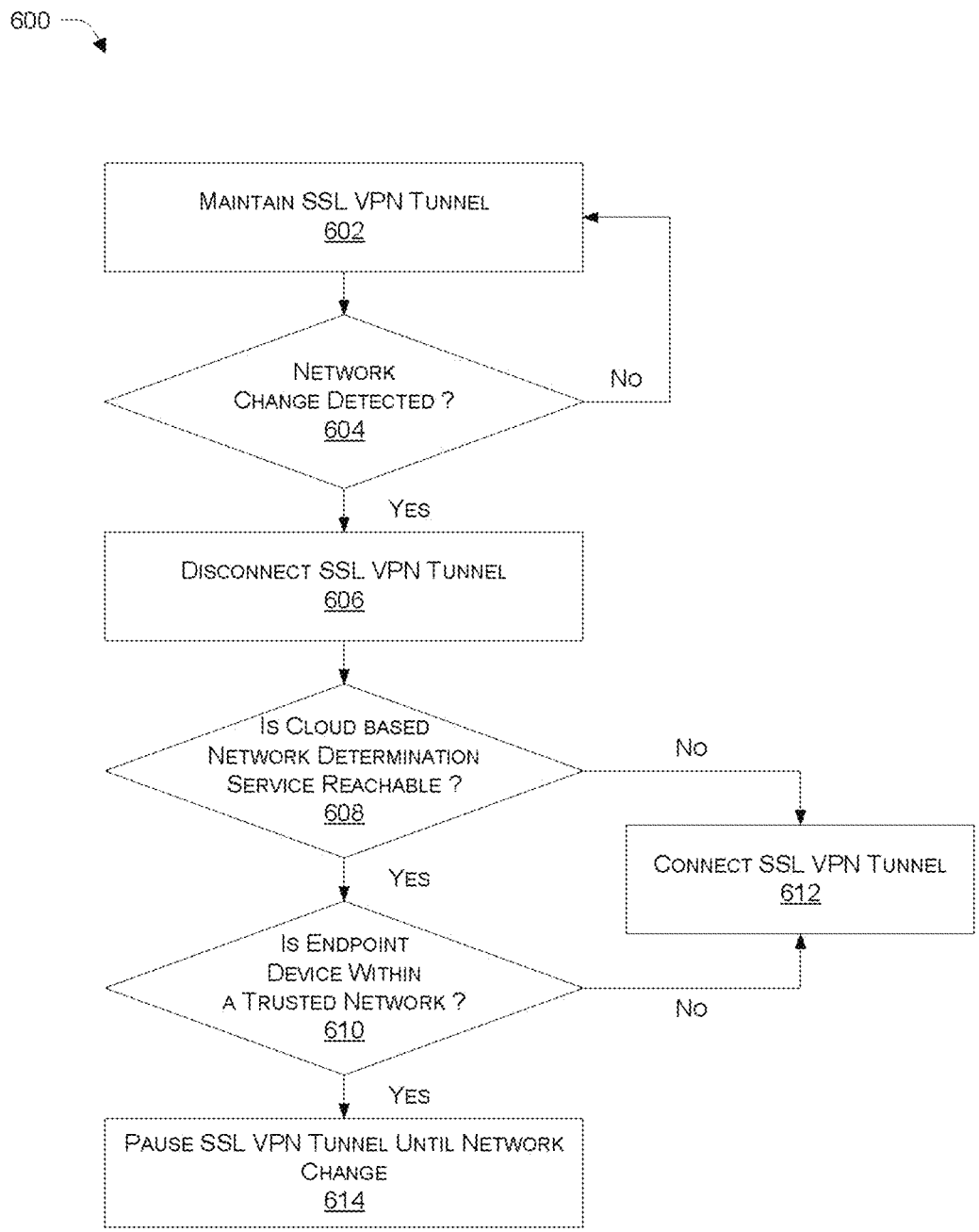
FIG. 6 is a flow chart illustrating network location-based activation and pausing of a secure Internet connection in accordance with an embodiment of the present disclosure.

FIG. 6 is a flow chart 600 illustrating network location-based activation and pausing of a secure Internet connection in accordance with an embodiment of the present disclosure. In an embodiment, an endpoint device (e.g., endpoint device 122, 222, 124, or 224) may be configured to maintain a secure Internet connection (e.g., an SSL VPN tunnel), as shown at block 602, to route network traffic through a cloud-based security service, when the endpoint device is not within a trusted network.

At decision block 604, monitoring is performed to detect whether a network to which the endpoint device is connected has changed. According to one embodiment, an endpoint security agent (e.g., endpoint security agent 108, 208, or 210) periodically monitors for changes to an IP address assigned to the endpoint device (e.g., the IP address of the primary ethernet adapter of the endpoint device 122). When there is no change in the network, the endpoint security agent loops back to block 602 and maintains the SSL VPN tunnel. When the endpoint security agent detects a change in the network, processing continues with block 606.

At block 606, the endpoint security agent disconnects, temporarily disables, or pauses the SSL VPN tunnel.

At decision block 608, it is determined whether a cloud-based trusted network determination service (e.g., trusted network determination service 112a-b or 212) is reachable. If so processing continues with decision block 610; otherwise, processing branches to block 612.

At block 612, the SSL VPN tunnel is connected or enabled. According to one embodiment, network traffic exchanged between the endpoint device and the cloud-based security service (e.g., a SASE platform) routed through the SSL VPN tunnel.

At decision block 610, a determination is made regarding whether the endpoint device is within a trusted network. According to one embodiment, this determination is made by invoking an API of the trusted network determination service. When the endpoint device is confirmed to be connected to a trusted network, processing continues with block 614; otherwise, processing branches to block 612.

At block 614, the endpoint security agent may pause the SSL VPN tunnel until a further network change is detected.

Figure 7:
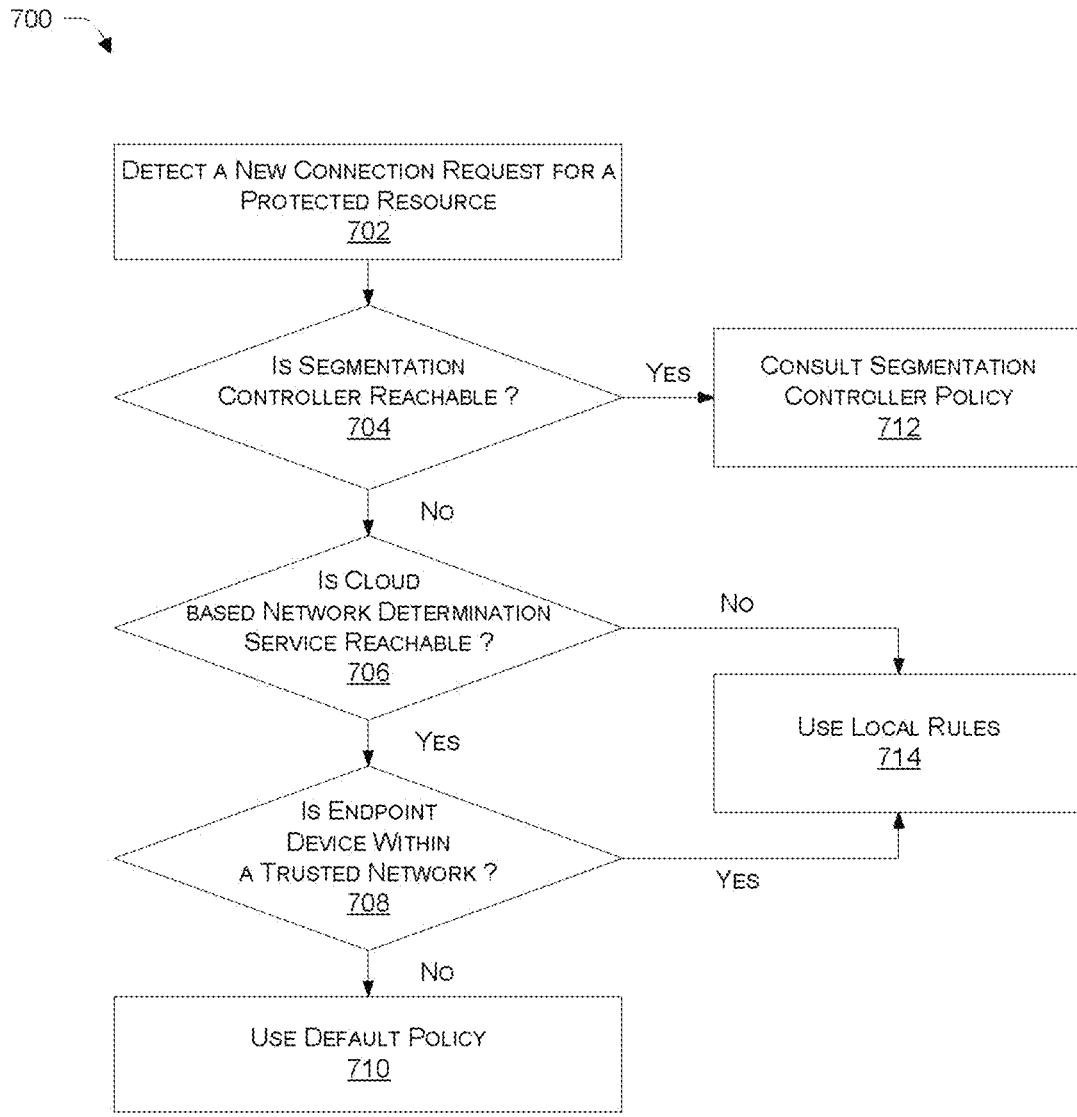
FIG. 7 is a flow chart illustrating network location-based security policy application in accordance with an embodiment of the present disclosure.

FIG. 7 is a flow chart 700 illustrating network location-based security policy application in accordance with an embodiment of the present disclosure. In an embodiment, an endpoint device (e.g., endpoint device 122, 222, 124, or 224) may be configured to use security rules that control access to network resources across different microsegments.

At block 702, a connection attempt to a protected resource is detected. According to one embodiment, an endpoint security agent (e.g., endpoint security agent 108, 208, or 210) running of an endpoint device may intercept all connection attempts originated by the endpoint device or received by the endpoint device.

At decision block 704, a determination is made regarding whether a segmentation controller (e.g., security service 214) is reachable. If the segmentation controller is reachable, processing branches to block 712; otherwise, processing continues with decision block 706.

At block 712, the segmentation controller is consulted. According to one embodiment, the endpoint security agent provides metadata regarding the connection attempt to the segmentation controller and requests a determination by the segmentation controller regarding how to handle (e.g., block or allow) the connection attempt.

At decision block 706, when the segmentation controller is not reachable, the endpoint security agent further determines whether a cloud-based trusted network determination service (e.g., trusted network determination service 112a-b or 212) is reachable. If the trusted network determination service is reachable, processing continues with decision block 708; otherwise, processing branches to block 714.

At block 714, local rules are used. According to one embodiment, a micro-segmentation agent running on the endpoint device and associated with (e.g., controlled by or integrated within) the endpoint security agent is reconfigured to process connection attempts based on local IP-based rules and until reconfigured otherwise uses the local IP-based rules to allow or block connection attempts rather that consulting with the segmentation controller.

At decision block 708, a determination is made regarding whether the endpoint device is within a trusted network. According to one embodiment, this determination is made by invoking an API of the trusted network determination service. When the endpoint device is confirmed to be connected to a trusted network, processing continues with block 714; otherwise, processing branches to block 710.

At block 710, a default policy is used. For example, a default policy may be applied to inbound or outbound connection attempts intercepted by the endpoint security agent to determine whether to allow or block the connection attempts.

Figure 8A:
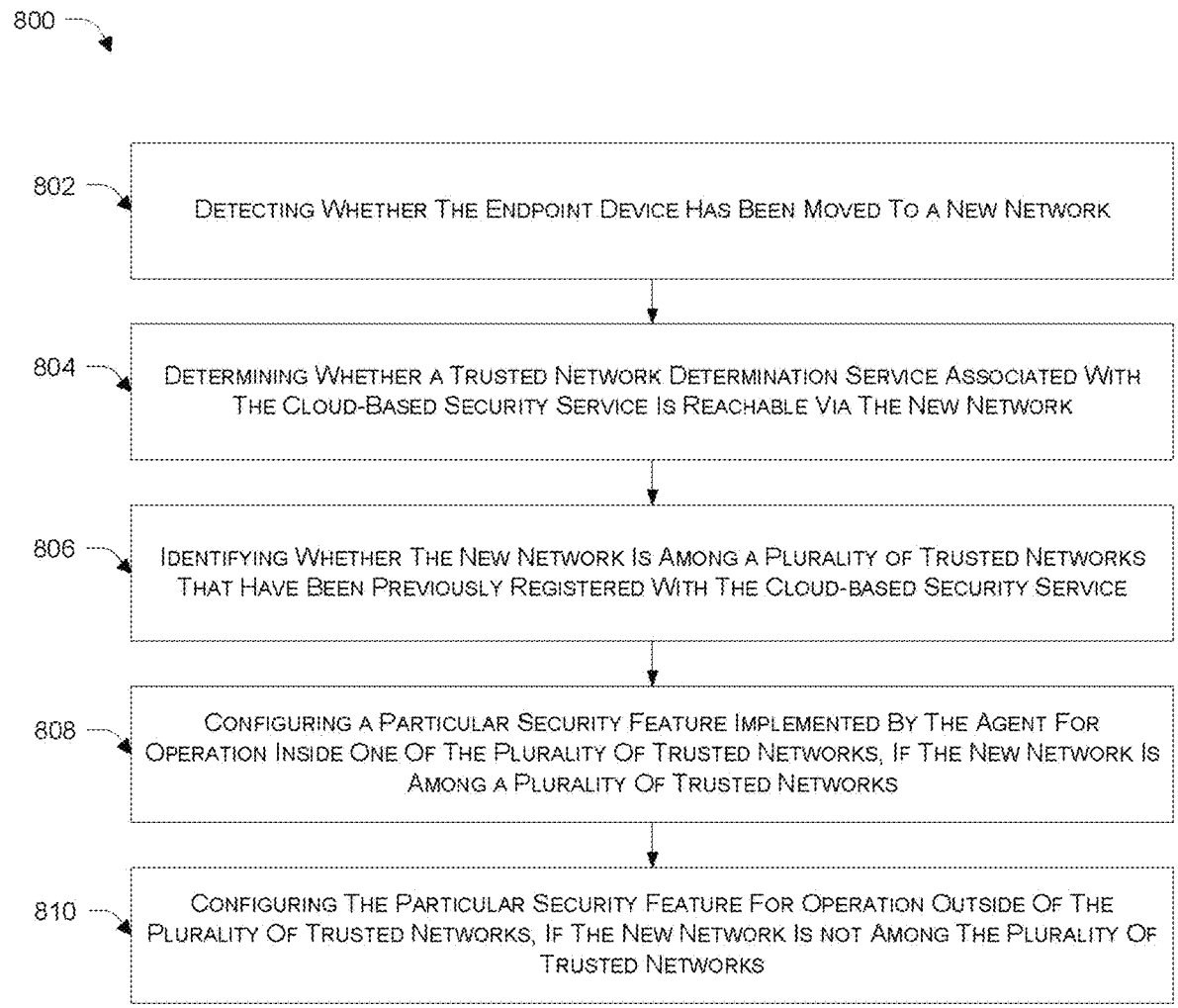
FIG. 8A is a flow diagram illustrating a method for network location-based security adaption in accordance with an embodiment of the present disclosure.

FIG. 8A is a flow diagram illustrating a method 800 for network location-based security adaption in accordance with an embodiment of the present disclosure. According to one embodiment, the method 800 is performed by an endpoint security agent (e.g., endpoint security agent 108, 208, or 210) running on an endpoint device (e.g., endpoint device 122, 222, 124, or 224) by a processing resource of the endpoint device.

At block 802, the endpoint security agent detects whether the endpoint device has been moved to a new network. For example, the endpoint security agent may periodically monitor an IP address assigned to the endpoint device and compare it to a previous IP address assigned to the endpoint device. The IP address associated with the endpoint device may be an IP address associated with a primary ethernet adapter of the endpoint device. In one embodiment, when the currently assigned IP address differs from the previous IP address, the endpoint security agent concludes the endpoint device has moved from one network to another.

At block 804, the endpoint security agent determines whether a trusted network determination service (e.g., trusted network determination service 112*a-b* or 212) associated with a cloud-based security service (e.g., cloud-based security service 106 or 206) is reachable via the new network.

At block 806, the endpoint security agent identifies whether the new network is among a plurality of trusted networks that have been previously registered with the cloud-based security service. In one embodiment, the endpoint security agent determines whether the new network is among the plurality of trusted networks by querying the trusted network determination service. In an embodiment, the determination of whether the trusted network determination service associated with the cloud-based security service is reachable is triggered responsive to detection of the network change and the process of identifying whether the new network is among a plurality of trusted networks that have been previously registered with the cloud-based security service is triggered responsive to an affirmative determination that the trusted network determination service is reachable.

At block 808, when the new network is determined to be among a plurality of trusted networks, the endpoint security agent configures a particular security feature implemented by the endpoint security agent for operation inside a trusted network.

At block 810, when the new network is determined not to be among a plurality of trusted networks, the endpoint security agent configures a particular security feature implemented by the endpoint security agent for operation outside a trusted network.

Figure 8B:
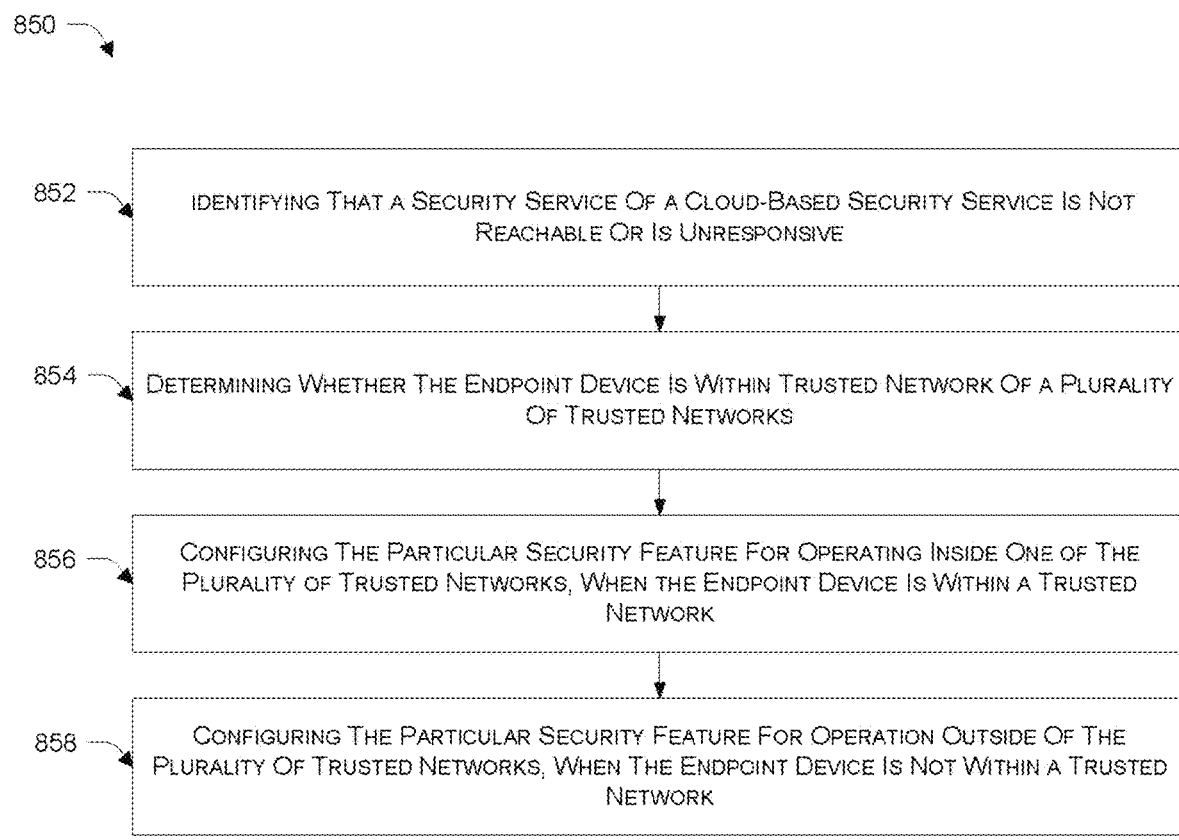
FIG. 8B is a another flow diagram illustrating a method for network location-based security adaption in accordance with an embodiment of the present disclosure.

FIG. 8B illustrates a flow diagram illustrating another method 850 for network location-based security adaption in accordance with an embodiment of the present disclosure. A method 850 is an endpoint security agent (e.g., endpoint security agent 108, 208, or 210) running on an endpoint device (e.g., endpoint device 122, 222, 124, or 224) by a processing resource of the endpoint device.

At block 852, the endpoint security agent identifies a security service of a cloud-based security service is not reachable or is unresponsive. The security service (e.g., security service 214) may be associated with a particular security function (e.g., micro-segmentation) implemented by the endpoint security agent or another agent (e.g., a micro-segmentation agent) associated with the endpoint security agent.

At block 854, the endpoint security agent determines whether the endpoint device is within a trusted network of a plurality of trusted networks. According to one embodiment, responsive to an affirmative identification in block 852 that the security service is not reachable or is unresponsive, the endpoint security agent checks with a trusted network determination service regarding whether the endpoint device is within a network that is one of the trusted networks, which have been previously registered with the cloud-based security service.

At block 856, when the endpoint device is confirmed to be within a trusted network, a particular security feature is configured by the endpoint security agent for operation inside one the trusted network.

At block 856, when the endpoint device is confirmed to not be within a trusted network, a particular security feature is configured by the endpoint security agent for operation outside a trusted network.

While various examples herein have been described with reference to particular example security features implemented on an endpoint device (e.g., by the endpoint security agent or an associated agent) and with reference to configuring one or more security features based on whether the endpoint device is within our outside of a trusted network, those skilled in the art will appreciate the methodologies described herein are equally applicable to other security features and other locations. For example, in addition to or as an alternative to adjusting security function behavior based on being inside/outside a trusted network, the endpoint security engine may also adjust behavior based on country, geolocation, or other network properties (e.g., adjusting logging when the endpoint device is located in a country regulated by General Data Protection Regulation (GDPR), increasing security posture when the endpoint device is located in a high risk country (Russia, China, etc.), adjusting web/URL filtering policy based on whether the endpoint device is inside/outside of trusted network, and/or disabling quarantine when the endpoint device leaves a trusted network so that endpoint device is able to connect to a public network and get remediated).

While in the context of various examples described herein the endpoint security agent determines whether the endpoint device on which it is running is inside/outside a trusted network by making use of a cloud-based trusted network determination service, in alternative embodiments, this determination may be made local to the endpoint device by, for example, periodically pushing the list of trusted networks to the endpoint security agents or having the endpoint security agents periodically pull the lists of trusted networks from the cloud and making use of a public IP lookup service.

Figure 9:
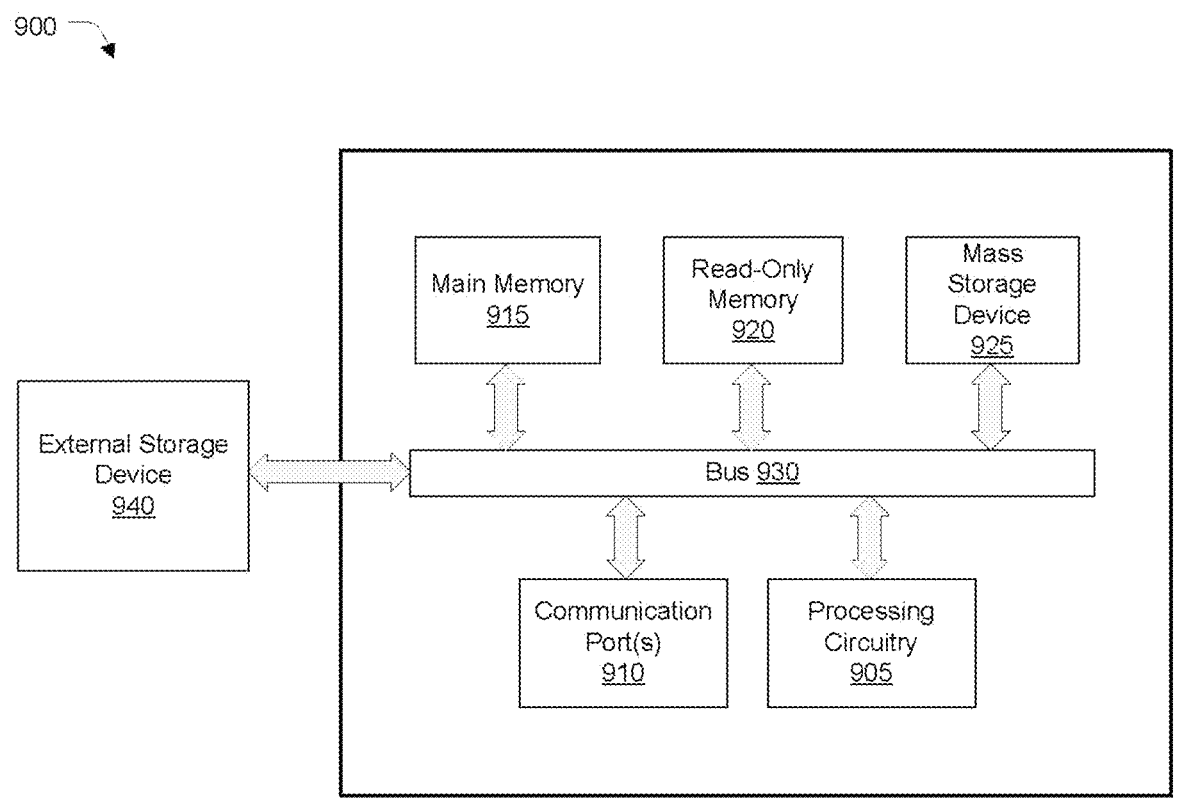
FIG. 9 illustrates an exemplary computer system in which or with which embodiments of the present invention may be utilized.

FIG. 9 illustrates an exemplary computer system in which or with which embodiments of the present invention may be utilized. As shown in FIG. 9, a computer system includes an external storage device 940, a bus 930, a main memory 915, a read-only memory 920, a mass storage device 925, a communication port 910, and one or more processing resources (e.g., processing circuitry 905). Computer system 900 may represent some portion of various systems (e.g., a trusted network determination service, a firewall, an O&A platform, a web portal, or a security service) associated with a cloud-based security service (e.g., cloud-based security service 106 or 206), an endpoint device (e.g., endpoint device 122, 124, 222, or 224), or a network location-based security adaptation system (e.g., network location-based security adaptation system 302).

Those skilled in the art will appreciate that computer system 900 may include more than one processor and communication ports 910. Examples of processing circuitry 905 include, but are not limited to, an Intel® Itanium® or Itanium 2 processor(s), or AMD® Opteron® or Athlon MP® processor(s), Motorola® lines of processors, Forti-SOC™ system on chip processors or other future processors.

Processing circuitry 905 may include various modules associated with embodiments of the present invention.

Communication port 910 can be any of an RS-232 port for use with a modem-based dialup connection, a 10/100 Ethernet port, a Gigabit or 10 Gigabit port using copper or fiber, a serial port, a parallel port, or other existing or future ports. Communication port 910 may be chosen depending on a network, such as a Local Area Network (LAN), Wide Area Network (WAN), or any network to which the computer system connects.

Memory 915 can be Random Access Memory (RAM), or any other dynamic storage device commonly known in the art. Read-Only Memory 920 can be any static storage device(s) e.g., but not limited to, a Programmable Read-Only Memory (PROM) chips for storing static information e.g. start-up or BIOS instructions for processing circuitry 905.

Mass storage 925 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 930 communicatively couples processing circuitry 905 with the other memory, storage, and communication blocks. Bus 930 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing circuitry 905 to a software system.

Optionally, operator and administrative interfaces, e.g. a display, keyboard, and a cursor control device, may also be coupled to bus 930 to support direct operator interaction with the computer system. Other operator and administrative interfaces can be provided through network connections connected through communication port 910. An external storage device 940 can be any kind of external hard-drives, floppy drives, IOMEGA® Zip Drives, Compact Disc-Read-Only Memory (CD-ROM), Compact Disc-Re-Writable (CD-RW), Digital Video Disk-Read Only Memory (DVD-ROM). The components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents, will be apparent to those skilled in the art without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document, terms "coupled to" and "coupled with" are also used euphemistically to mean "communicatively coupled with" over a network, where two or more devices can exchange data with each other over the network, possibly via one or more intermediary devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method performed within an agent running on an endpoint device by a processing resource of the endpoint device, the method comprising:
   detecting whether the endpoint device has been moved from an original network to a new network by monitoring for changes to an Internet Protocol (IP) address indicating that the endpoint device has moved from the original network to the new network associated with the endpoint device;
   when said detecting of the movement from the original network to the new network is affirmative:
   determining whether a trusted network determination service associated with a cloud-based security service is reachable via the new network, wherein the trusted network determination service can confirm on behalf of an endpoint security agent whether the new network to which the endpoint device is connected is part of a list of trusted networks;

when said determining whether the trusted network determination service associated with the cloud-based security service is reachable is affirmative:

identifying whether the new network is among a plurality of trusted networks that have been previously registered with the cloud-based security service by querying the trusted network determination service; and when the new network is among a plurality of trusted networks, configuring a particular security feature implemented by the agent in a first mode for operation inside one of the plurality of trusted networks; and when the new network is not among a plurality of trusted networks, configuring the particular security feature in a second mode to provide privacy and security for operation outside of the plurality of trusted networks.

2. The method of claim 1, wherein the particular security feature comprises a secure Internet tunnel between the agent and a cloud-based security service, wherein configuration of the secure Internet tunnel for operation inside one of the plurality of trusted networks comprises deactivating the secure Internet tunnel, and wherein configuration of the secure Internet tunnel for operation outside of the plurality of trusted networks comprises activating the secure Internet tunnel.

3. The method of claim 1, further comprising when said determining is negative, configuring the particular security feature for operation outside of the plurality of trusted networks.

4. The method of claim 1, wherein the IP address associated with the endpoint device comprises an IP address associated with a primary ethernet adapter of the endpoint device.

5. The method of claim 1, wherein the agent comprises an endpoint protection platform.

6. The method of claim 1, wherein the agent is integrated with an endpoint protection platform.

7. The method of claim 1, wherein the agent is independent from an endpoint protection platform running on the endpoint device.

8. The method of claim 1, wherein the cloud-based security service includes a plurality of trusted network determination services running in multiple regions throughout the world and wherein the trusted network determination service represents one of the plurality of trusted network determination services that is nearest to the endpoint device.

9. The method of claim 1, wherein the plurality of trusted networks represent office networks of a customer of the cloud-based security service that are securely connected to the cloud-based security service.

10. The method of claim 1, wherein the plurality of trusted networks are updated by an orchestration and automation platform associated with the cloud-based security service.

11. The method of claim 2, wherein the cloud-based security service comprises a Secure Access Service Edge (SASE) platform.

12. The method of claim 2, wherein deactivation of the secure Internet tunnel facilitates access by the endpoint device to local resources within the new network.

13. The method of claim 2, wherein activation of the secure Internet tunnel protects communications via the new network to the cloud-based security service.

14. The method of claim 11, wherein the secure Internet tunnel comprises a secure Transport Layer Security (TLS) connection between the agent and a firewall associated with the SASE platform.

15. An endpoint device comprising:
a processing resource; and
a non-transitory computer-readable medium, coupled to the processing resource, having stored therein instructions that when executed by the processing resource cause the processing resource to perform a method comprising:

detecting, by an agent running on the endpoint device, whether the endpoint device has been moved from an original network to a new network by monitoring for changes to an Internet Protocol (IP) address indicating that the endpoint device has moved from the original network to the new network associated with the endpoint device;

when said detecting of the movement from the original network to the new network is affirmative:

determining whether a trusted network determination service associated with a cloud-based security service is reachable via the new network, wherein the trusted network determination service can confirm on behalf of an endpoint security agent whether the new network to which the endpoint device is connected is part of a list of trusted networks;

when said determining whether the trusted network determination service associated with the cloud-based security service is reachable is affirmative:

identifying, by the agent, whether the new network is among a plurality of trusted networks that have been previously registered with the cloud-based security service by querying the trusted network determination service; and when the new network is among a plurality of trusted networks said identifying is affirmative, configuring, by the agent, a particular security feature implemented on the endpoint device in a first mode of operation for operation inside one of the plurality of trusted networks; and when the new network is not among a plurality of trusted networks said identifying is negative, configuring the particular security feature in a second mode of operation to provide privacy and security for operation outside of the plurality of trusted networks.

16. The endpoint device of claim 15, wherein the particular security feature comprises a secure Internet tunnel between the agent and a cloud-based security service, wherein configuration of the secure Internet tunnel for operation inside one of the plurality of trusted networks comprises deactivating the secure Internet tunnel, and wherein configuration of the secure Internet tunnel for operation outside of the plurality of trusted networks comprises activating the secure Internet tunnel.

17. The endpoint device of claim 15, wherein the method further comprises when said determining is negative, configuring, by the agent, the particular security feature for operation outside of the plurality of trusted networks.

18. The endpoint device of claim 15, wherein the IP address associated with the endpoint device comprises an IP address associated with a primary ethernet adapter of the endpoint device.

19. The endpoint device of claim 15, wherein the agent comprises an endpoint protection platform.

20. The endpoint device of claim 15, wherein the agent is integrated with an endpoint protection platform.

21. The endpoint device of claim 15, wherein the agent is independent from an endpoint protection platform running on the endpoint device.

22. The endpoint device of claim 15, wherein the cloud-based security service includes a plurality of trusted network determination services running in multiple regions throughout the world and wherein the trusted network determination service represents one of the plurality of trusted network determination services that is nearest to the endpoint device.

23. The endpoint device of claim 15, wherein the plurality of trusted networks represent office networks of a customer of the cloud-based security service that are securely connected to the cloud-based security service.

24. The endpoint device of claim 15, wherein the plurality of trusted networks are updated by an orchestration and automation platform associated with the cloud-based security service.

25. The endpoint device of claim 16, wherein the cloud-based security service comprises a Secure Access Service Edge (SASE) platform.

26. The endpoint device of claim 16, wherein deactivation of the secure Internet tunnel facilitates access by the endpoint device to local resources within the new network.

27. The endpoint device of claim 16, wherein activation of the secure Internet tunnel protects communications via the new network to the cloud-based security service.

28. The endpoint device of claim 25, wherein the secure Internet tunnel comprises a secure Transport Layer Security (TLS) connection between the agent and a firewall associated with the SASE platform.

* * * * *